United States Patent
Carlson

[15] 3,656,285
[45] Apr. 18, 1972

[54] LAWNMOWER

[72] Inventor: Morris William Carlson, 5403 Northwest Boulevard, Davenport, Iowa 52806

[22] Filed: Nov. 6, 1970

[21] Appl. No.: 87,485

[52] U.S. Cl. .................................56/244, 56/6, 56/290
[51] Int. Cl. .................................................A01d 55/24
[58] Field of Search.............56/244, 245, 6, 290, 291, 292

[56] References Cited

UNITED STATES PATENTS

| | | | |
|---|---|---|---|
| 2,079,945 | 5/1937 | Manning | 56/244 |
| 2,543,386 | 2/1951 | Templeton | 56/244 X |
| 2,948,099 | 8/1960 | Johnson | 56/244 |
| 3,043,079 | 7/1962 | Aston | 56/290 |
| 3,425,196 | 2/1969 | Reed | 56/16.9 |
| 3,561,202 | 2/1971 | Tupper | 56/245 X |

Primary Examiner—Russell R. Kinsey
Attorney—Haven E. Simmons and James C. Nemmers

[57] ABSTRACT

A power lawnmower is disclosed employing an endless moving band with integral teeth which cut the grass with a scissors-like action in conjunction with fixed teeth on a forwardly disposed, transverse cutting assembly through which the band passes. A particular feature of the mower is the provision of grass gathering elements which project from the moving teeth and travel therewith. The chief functions of such elements are to bring the grass into the teeth, to retain it there until cut in order to prevent the grass from being knocked down or aside by the moving teeth, and finally to discharge the clippings rearwardly. Improvements in the design of the moving and fixed teeth are also disclosed as well as foldable side extensions for the mower to increase its cutting width.

22 Claims, 17 Drawing Figures

INVENTOR.
MORRIS WILLIAM CARLSON
BY
ATTORNEY

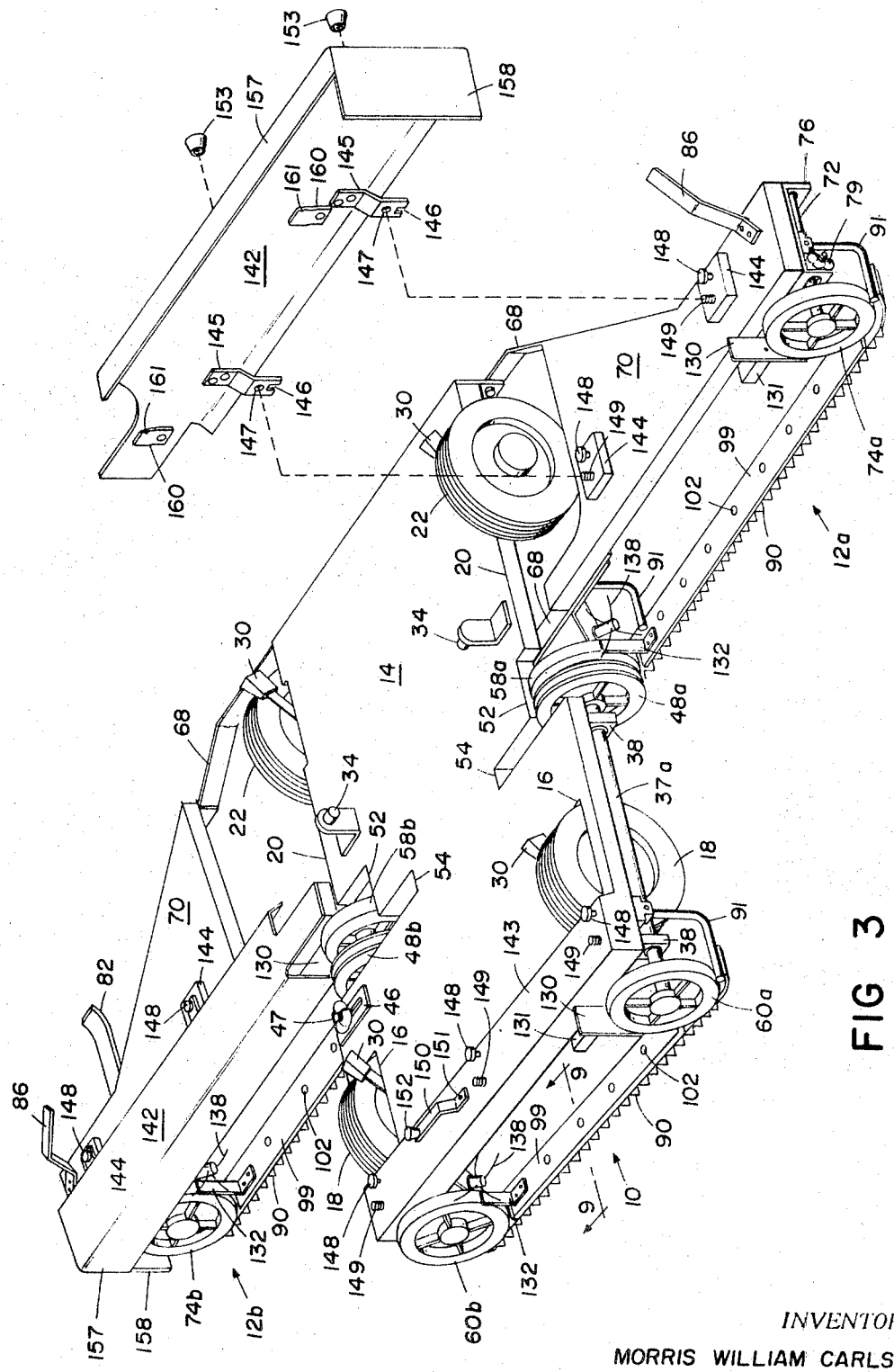

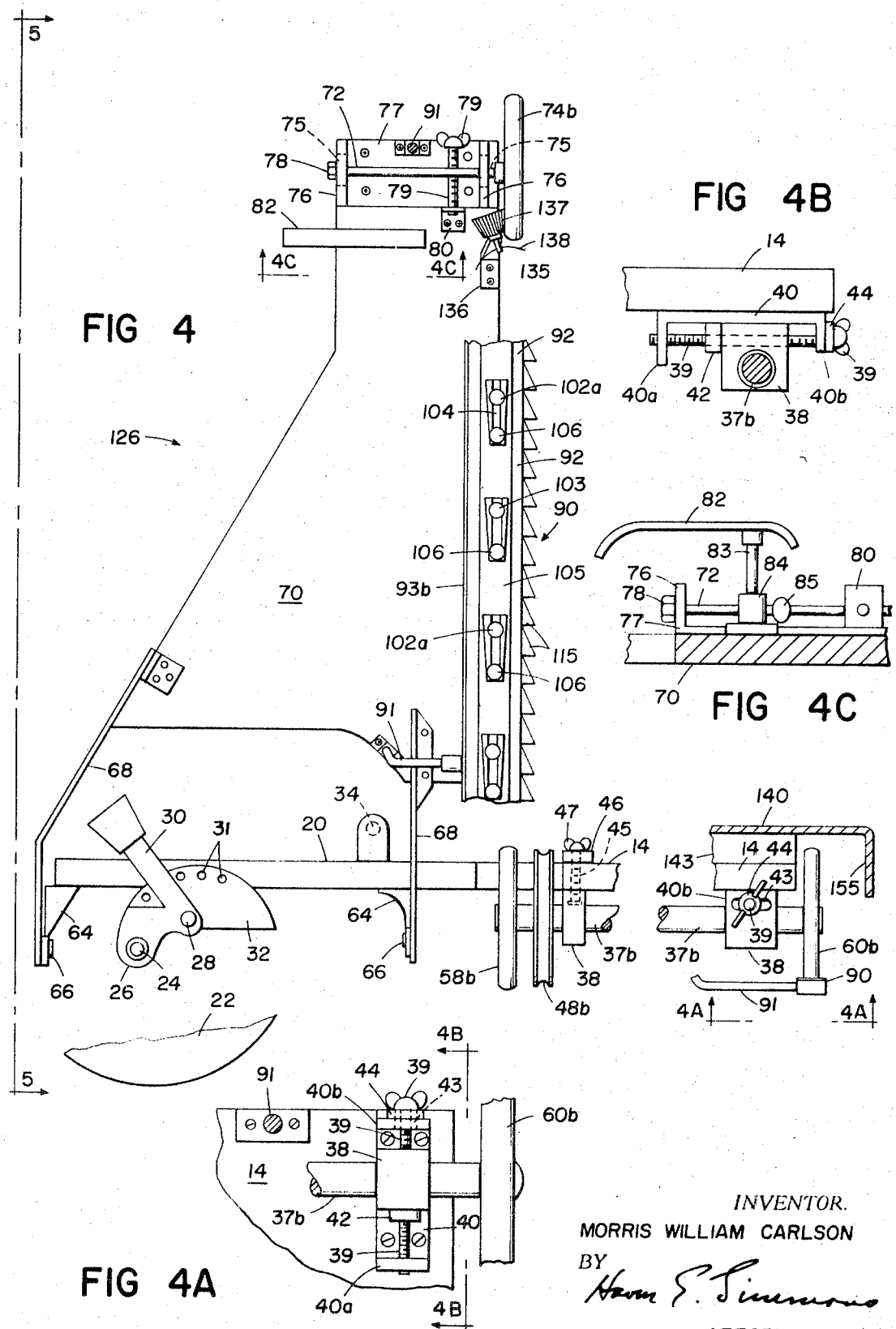

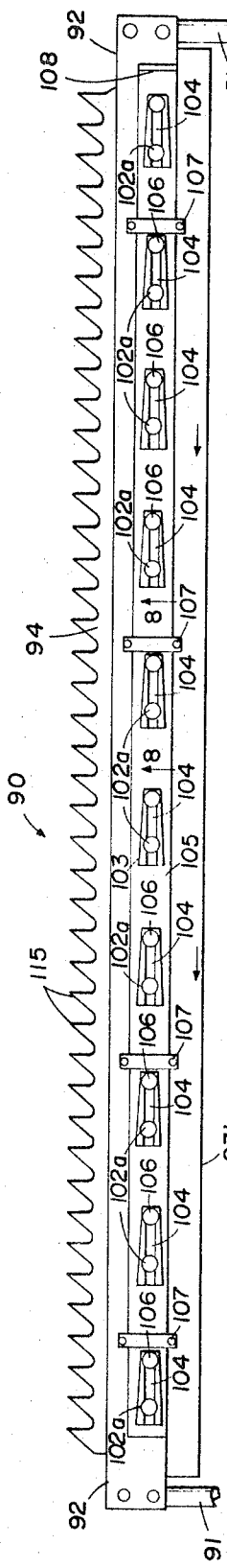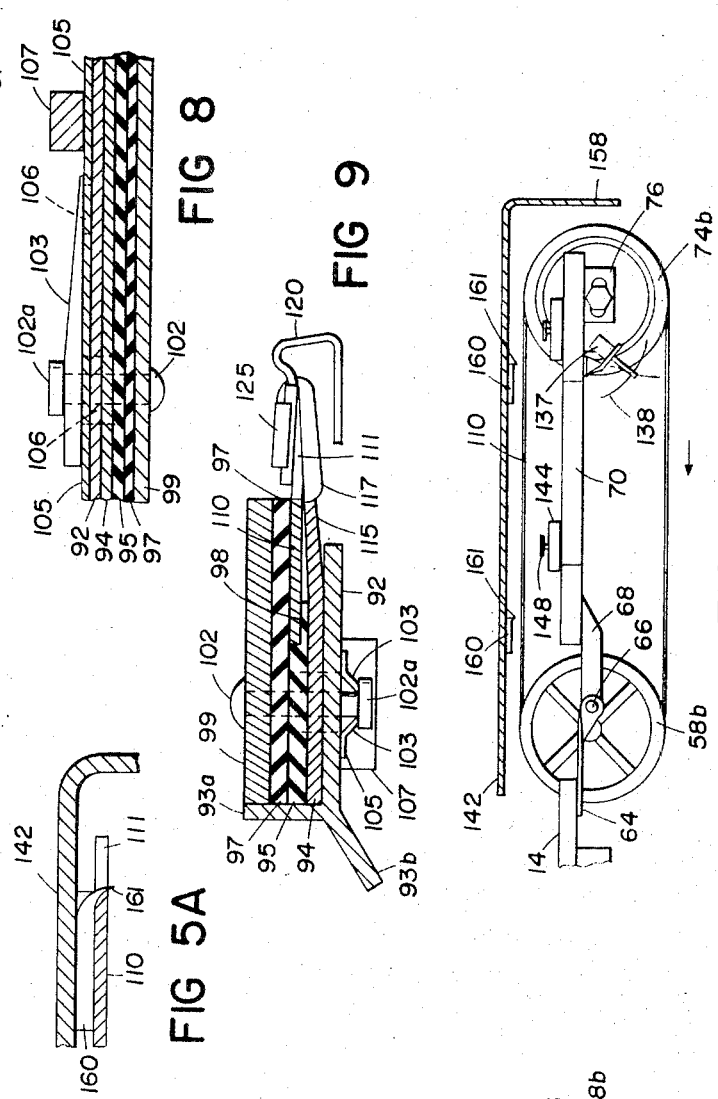

PATENTED APR 18 1972 3,656,285
SHEET 5 OF 5
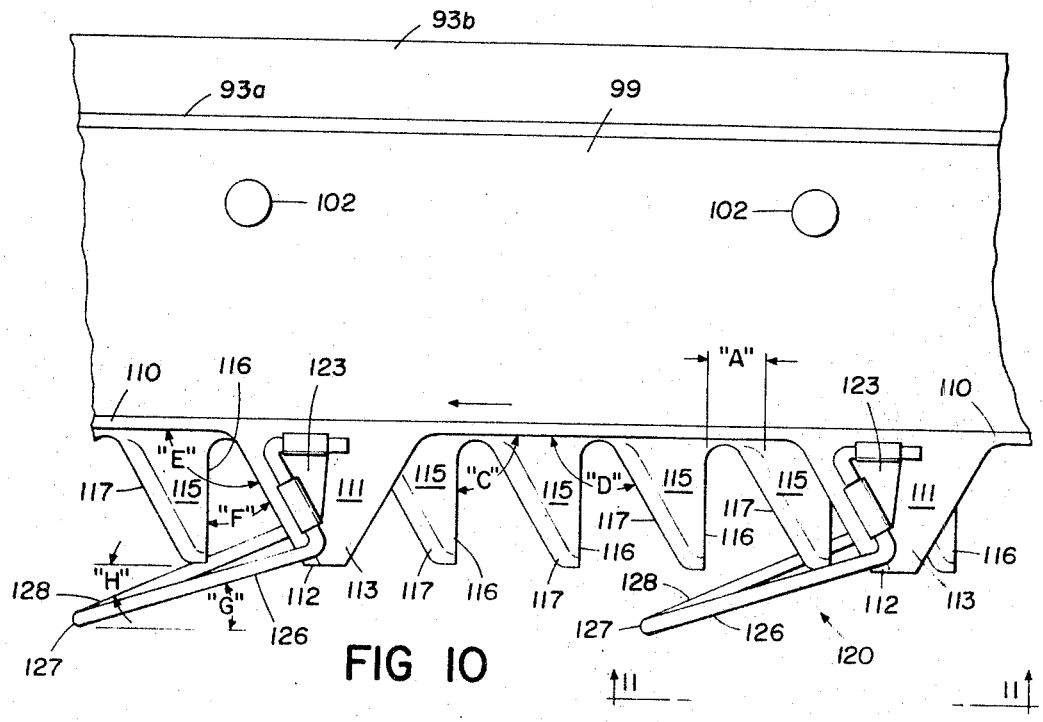
FIG 10
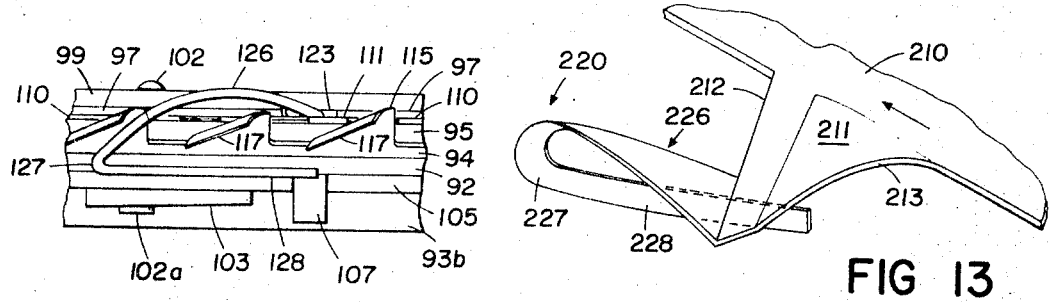
FIG 11
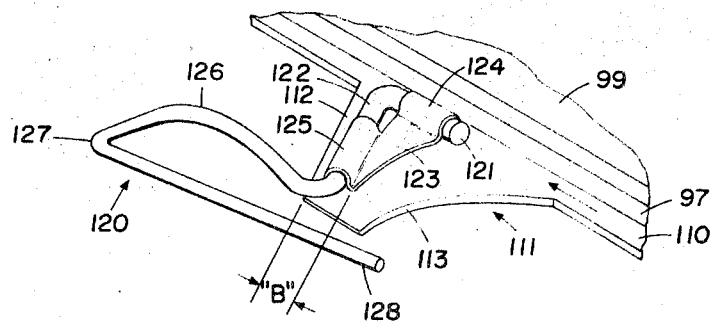
FIG 12
FIG 13
INVENTOR.
MORRIS WILLIAM CARLSON
BY Haven P. Simmon
ATTORNEY

LAWNMOWER

BACKGROUND OF THE INVENTION

Two types of lawnmowers are presently popular: the reel type in which the grass is cut by scissors action of the curved blades of the reel acting against a fixed straight blade; and the rotary type in which the grass is cut by the action of a rapidly turning, pitched blade at the lower end of a vertical driven shaft. The chief advantage of reel mowers is that they produce a smooth lawn surface which remains green owing to the fact the ends of the grass are cleanly cut. But they have many disadvantages; they are relatively cumbersome; most of them cannot cut grass close to the sides of buildings, tree trunks, etc., owing to the necessary drive mechanism at the ends of the reel, nor can they cut many types of plant stalks when more than a few inches in height, dandelion seed stalks being a particularly good example; and they are generally more costly than rotary mowers of equivalent cutting width and quality.

The advantages of rotary mowers are that they can be used where the grass, weeds, etc. are of almost any height, and they are relatively low in cost. But they, too, have many disadvantages. For instance, a rotary mower is inherently dangerous. It will cut through most objects which come in contact with its blade, and will throw small objects with considerable speed when the discharge chute, as is normal, is set to throw the clippings over an area. Furthermore, it is basically a chopping device which tears rather than cuts the ends of the grass resulting in a brownish cast to the lawn for some time afterwards. It also has a pronounced tendency to slice off, or scalp, the tops of ridges, the edges of flat areas, miscellaneous high points, etc., and to discharge the clippings in bunches when the grass is wet. Practical designs of both reel and rotary mowers are also limited in cutting width. The relative bulk and high power requirements of the reel type practically limit a walking, motor driven unit to about 21 inches in cutting width. The high power consumption of the rotary type, owing primarily to windage losses, generally limits the cutting width of a walking unit to about 22 inches. Very little of the power required to drive either type is consumed or needed for the actual cutting of the grass.

Despite all the disadvantages of reel and rotary lawn mowers, their use persists to the practical exclusion of any other type. This is true even though the prior art abounds with other types. Some of the more prominent of the latter are mowers which employ various forms of endless moving bands, belts or chains bearing cutting teeth which operate alone or in conjunction with a stationary blade, comb or other teeth. Varied arrangements of these are disclosed, for example, in the following U.S. Pat. Nos.: 765,126; 1,353,891; 1,775,421; 1,968,408; 2,079,945; 2,319,425; 2,481,364; 2,497,573; 2,514,861; 2,728,181; 2,744,376; 2,782,582; 2,821,060; 2,826,888; 2,867,069; 2,941,345; 2,957,294; 3,006,126; 3,006,129; and 3,242,659 issued over the period 1904 to 1966. But none of these, so far as known, has ever enjoyed much success or is currently marketed. Theoretically, a toothed, endless band moving transversely of the direction of travel of the mower should have many significant advantages over the reel and rotary types. For instance, there is no inherent limit to its width. A cutting width of 60 inches or more for walking models should be feasible. It could be articulated to permit the mower to follow the contour of the ground without scalping the high spots or skipping over the low areas, and could cut close to the walls of buildings, tree trunks, etc. It would be safe since it would have no tendency to throw objects owing to the limited depth of the teeth. Little power would be required since energy losses would be small. It would be relatively light in weight. And the grass would be cut cleanly, leaving the lawn green after mowing. Yet, as noted, these theoretical advantages have apparently never been brought to practical fruition. An investigation was undertaken to determine why.

That investigation disclosed that the efficiency of the toothed band or chain type of mower depends greatly upon the height, mass and/or density of the grass to be cut. It was found, for instance, that individual blades of grass in sparsely covered areas were not consistently cut, especially if only a short length were to be trimmed from their tops, by a mower of this type. The reason is apparently that the cutting action employed requires the grass to offer some resistance to its movement during the cutting operation. This is provided by the stiffness of the blades themselves in the case of tall grass, by their inertia in the case of heavy grass, or by support from the grass immediately behind the blades being cut in the case of a thick growth of ordinary lawn grass. In other cases, the blades of grass tended simply to be pushed downwards or knocked aside without being cut. Trial and error tests clearly indicated that for proper cutting of typical lawn grass, as opposed to tall or heavy field grass, the grass must be brought into the cutting device and kept there during the cutting action. This is accomplished in the case of the reel type mower by the moving blades of the reel and in the case of the rotary type by the "updraft" of air created by the pitch of the revolving blade. But the toothed band or chain type of mower of the prior art does not have any really effective equivalent action or other means to provide the same effect. Even a stationary "comb" ahead of the teeth is ineffective, for it, too, tends simply to knock some of the grass aside or downwards. Probably this is the chief reason mowers of this type have never proved very practical for cutting ordinary lawn grass, and accordingly, the chief object of the present invention is to provide a lawnmower of that type in which those deficiencies are eliminated while its advantages are retained and enhanced.

SUMMARY OF THE INVENTION

The lawnmower of the present invention incorporates a wheeled frame or platform which is fitted with a typical handle for guidance by the operator and upon which is mounted a relatively small electric motor or gasoline engine to furnish power for the grass cutting mechanism. The motor or engine belt drives a shaft on which is fixed one of a pair of spaced pulleys at the front of the mower outboard and forward of its wheels and facing the direction of travel. About the pulleys and driven thereby is an endless moving band of suitable spring steel having its forward edge formed to provide a series of relatively widely spaced, forwardly projecting teeth of trapezoidal shape. The lower pass of the band travels through a fixed cutting assembly extending between and under the pulleys and disposed at the desired cutting height of the grass. As they travel through the fixed cutting assembly, the moving teeth are held in close contact with the triangular shaped teeth of a fixed cutter bar by means of a pair of upper and lower plates between which the cutter bar and the moving band are sandwiched together with low-friction bearing material to guide the moving band. The fixed teeth are also integrally formed along the forward edge of the cutter bar but are more closely spaced than the moving teeth. The latter overlie the fixed teeth and both are upset to provide a scissors-like action therebetween which performs the actual cutting of the grass. The included angle between the cutting edges of the moving and fixed teeth can vary somewhat and optimum values of that angle, as well as of the angular shapes of the two sets of teeth themselves, are set forth in the more detailed description hereinafter provided.

While the design and relationship of the moving and fixed teeth constitute improvements over the prior art, yet the heart of the present invention lies in the means by which the grass is brought into engagement with the two sets of teeth and held there until cut. For this purpose, the moving band is fitted with a number of grass gathering elements, or "clasps" as they are hereinafter referred to, one of which projects forwardly from each moving tooth and travels therewith. The clasps are removably fixed to the moving teeth and are angled therefrom rather sharply in the direction of travel of the lower pass of the band and somewhat forwardly in the direction of travel of the mower. Each clasp, in its preferred form is fashioned from suitable spring wire and consists of an upper grass retaining portion anchored at one end to the upper face of the tooth, extending therefrom in the aforesaid directions to an outer bend at which point it is reversed downwardly to form a lower grass deflecting portion slightly to the rear of the upper portion and below the fixed teeth so as not to interfere with the latter during travel of the band. The relationship of the various parts of the clasp to each other as well as to the teeth are more precisely described hereafter together with alternate forms of clasps.

As the mower travels forwardly, the rapidly moving clasps separate the grass before the cutting assembly into successive bunches, propel the bunches positively into the teeth without knocking them down or aside, and retain them there until cut, after which they release the clippings and throw them toward the rear of the mower. The clasps have proven quite resistant to injury by obstacles and indeed tend to protect the teeth themselves. Even should a clasp be injured, it is readily replaceable owing to the manner in which it is removably secured to the band. The fixed cutting assembly is made so that it can be readily disassembled in order that the band and the cutter bar can be removed for replacement or for sharpening of their teeth.

The mower also includes two types of cleaning elements: fixed elements which block passage of the clippings into the pulleys and which clean their drive surfaces; and rotating elements which sweep away the clippings ahead of the fixed elements, all to prevent jamming of clippings between the pulleys and the band. Side extensions are removably attached to the mower in order to increase its cutting width, the cutting mechanism and operation of each extension being substantially identical to that of the mower itself. The extensions are also belt driven from the mower's motor or engine and are hinged thereto so that they can be folded up upon the mower when not needed or when working in small areas or about trees or buildings. In order to cut off power to its moving band, the hinge joint of each section is constructed so that the band is slackened when that section is raised for folding, and if desired, the joint may also incorporate counterbalancing springs to remove most of the weight from a skid upon which the outer end of the extension rides.

The result is a mower of relatively light weight and simplicity, requiring little power to operate and providing a smooth, uniformly cut lawn no matter whether the grass is short or long, sparse or thick. It possesses all the theoretical advantages enumerated above over the reel and rotary types but in a practical working form owing to the provision of the traveling elements or clasps on the moving, toothed band. Other and further advantages and features will be apparent from the more detailed description and the drawings which follow.

BRIEF DESCRIPTION OF THE DRAWINGS

FIG. 3 is an upper isometric view of the lawnmower and side extensions with the motor, handle, one of the covers and the moving bands omitted to illustrate the arrangement of the basic components.

FIG. 4 is a plan view of the underside of one of the side extensions in raised position showing the manner of its attachment to the mower as well as other details.

FIG. 4A is a detail view taken from the line 4A—4A of FIG. 4 and illustrates the band tensioning mechanism of the mower.

FIG. 4B is a sectional view along the line 4B—4B of FIG. 4A.

FIG. 4C is a sectional view along the line 4C—4C of FIG. 4 and illustrates the band tensioning mechanism and the supporting skid for one of the side extensions.

FIG. 5 is a rear elevational view taken from the line 5—5 of FIG. 4 illustrating the manner in which the hinge joints of the side extensions release the tension on their moving bands, many parts being omitted for clarity.

FIG. 5A is a sectional view along the line 5A—5A of FIG. 5.

FIG. 6 is similar to FIG. 5 but illustrates the side extension in its lowered position and the manner in which the moving band thereof is thereby retightened by the action of the hinge joint.

FIG. 7 is a bottom plan view of the fixed cutting assembly, but with the moving band omitted, illustrating the means by which it can be quickly dismantled.

FIG. 8 is a sectional view taken along the line 8—8 of FIG. 7.

FIG. 9 is a sectional view taken along the line 9—9 of FIG. 3 illustrating the arrangement of the moving band and fixed cutter bar in the cutting assembly as well as the quick disassembly features of the latter.

FIG. 10 is an enlarged top plan view of a portion of the cutting assembly illustrating the relationship of the moving and fixed teeth together with the removable clasps.

FIG. 11 is an elevational view taken from the line 11—11 of FIG. 10.

FIG. 12 is an enlarged detail view of a tooth of the moving band illustrating the formation thereof and the means by which a clasp is removably attached thereto.

FIG. 13 is an enlarged detail view of an alternate form of tooth and clasp for the moving band.

DESCRIPTION OF THE PREFERRED EMBODIMENT

Figure 1:
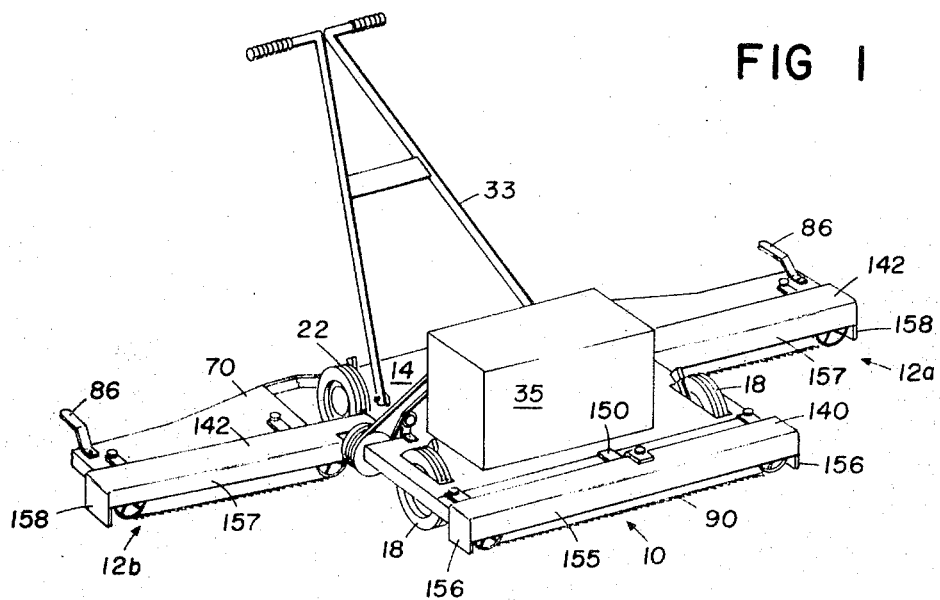
FIG. 1 is an upper isometric view of the lawnmower of the present invention with a pair of side extensions attached.
Figure 2:
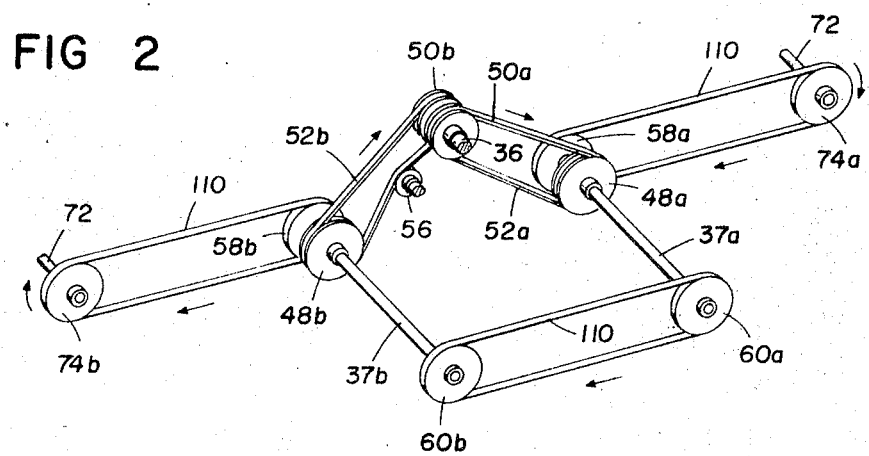
FIG. 2 schematically illustrates the relationship of the components of the drive train for the mower and the side extensions.

As illustrated in the drawings, particularly FIGS. 1 - 4, the lawnmower of the present invention consists of the mower proper 10 and two side extensions 12, sometimes designated 12a and 12b with respect to the right and left hand sides of the mower 10 as viewed in FIG. 1. The components of the mower 10 are carried essentially upon a generally rectangular platform 14 (see FIG. 3), though a suitable framed structure could be used instead. The platform 14 is apertured at 16 adjacent its forward side edges to provide for a pair of front wheels 18 and narrowed along its rear side edges at 20 to provide for a pair of rear wheels 22 in alignment with the front wheels 18, the track of the wheels 18 and 22 being less than the overall width of the forward portion of the platform 14 for reasons to be explained. The mounting of both pairs of wheels 18 and 22 is quite conventional and substantially identical, that for one rear wheel 22 being shown in more detail in FIG. 4. Each wheel 18 and 22 is journaled on a spindle 24 whose inner end is fitted with a plate 26 cranked laterally therefrom and rotably journaled on a headed bolt 28 which also receives one end of a laterally resilient adjusting arm 30 fixed to the plate 26. The arm 30 rotates the plate 26 about the bolt 28 and extends above the platform 14, being provided with a bayonet pin (not shown) which engages one of a series of recesses 31 in a sector plate 32 mounted together with the bolt 28 to the underside of the platform 14. Hence, as is obvious, adjustment of the four arms 30 will alter the elevation of the platform 14 with respect to the ground. Just forward of the rear wheels 22 a typical handle 33 for the operator is pivoted relative to the platform 14 upon trunnion brackets 34.

Atop the platform 14 between the front wheels 18 a suitable electric motor or gasoline engine 35 is appropriately mounted with its power takeoff shaft 36 rearward. Beneath the forward side edges of the platform 14 a pair of fore and aft drive shafts 37a, 37b are journaled in two pairs of pillow blocks 38 so that the shafts pass outboard of the front wheels 18. The drive shaft 37b is provided with a band tensioning and adjusting mechanism (see FIGS. 4, 4A and 4B) in which its forward pillow block 38 is carried on a transverse wing screw 39 supported between a pair of spaced, downturned lips 40a, 40b of a bracket 40 secured beneath the platform 14. The inner end of the screw 39 is disposed in an aperture in the lip 40a and is provided with threads which engage a nut 42 fixed to the inboard face of the pillow block 38. The screw 39 passes freely through the block 38 and a horizontal slot 43 in the other lip 40b, being provided with a washer 44 beneath its winged other end. The rear pillow block 38 is fixed to the lower end of a vertical screw 45 which passes up through a transverse slot in platform 14 and a plate 46 similarly slotted fixed to the upper face thereof and is fitted at its upper end with a wing nut 47. The drive shafts 37a, 37b extend beyond the rear pair of pillow blocks 38 and are fitted with a pair of driven V-pulleys 48a, 48b fixed thereto for which recesses 52 are provided in the side edges of the platform 14. The two pulleys 48a, 48b are in respective alignment with a pair of drive V-pulleys 50a, 50b fixed on the power takeoff shaft 36 and are connected by drive V-belts 52a, 52b, the platform 14 being provided with additional recesses 54 to provide clearance therefor. The mounting of the motor or engine 35 is made adjustable in any appropriate manner (not shown) so that the tension of the drive V-belt 52a can be properly maintained while the drive V-belt 52b is provided with a spring biased idler pulley 56 mounted to the platform 14 for the same purpose. The rear ends of the drive shafts 37a, 37b extend beyond the pulleys 48a, 48b and are fitted with band drive pulleys 58a, 58b fixed thereto while the forward ends of the shafts extend beyond the front edge of the platform 14 and are fitted with similar band drive pulleys 60a, 60b transversely aligned with each other, the pulley 60a being fixed to its shaft 37a while the pulley 60b is journaled on its shaft 37b to turn freely with respect thereto. The peripheral surfaces of all four pulleys 58a, 58b and 60a, 60b are fitted with frictional material and are somewhat crowned.

The side extensions 12a, 12b are each hinged on a pair of spaced gudgeons 64 secured beneath and along the rear side edges 20 of the platform 14 (see FIG. 4). The gudgeons 64 in turn receive a pair of pintles 66 at the inner ends of a pair of hinge arms 68 which extend laterally outwardly and are fixed beneath shaped, laterally extending platforms 70, which may also be constructed of suitable framing instead. The hinge arms 68 are resilient so that they may be sprung to remove their pintles 66 from the gudgeons 64 and thus permit the extensions 12 to be detached from the mower 10. As shown in FIGS. 5 and 6, the hinge axes of the extensions 12 are disposed somewhat laterally outwardly of the axes of the band pulleys 58a, 58b for purposes to be described. Across the outer ends of the platforms 70 are mounted a pair of fore and aft shafts 72 upon whose forward ends are journaled band pulleys 74a, 74b similar to the pulleys 58a, 58b and in respective transverse alignment therewith. The shafts 72 are supported in horizontal slots 75 in two spaced, downturned lips 76 of a pair of brackets 77 fixed beneath the platforms 70 to the rear of the pulleys 74a, 74b. The rear ends of the shafts 72 pass through the rear lips 76 and are fitted with nuts 78. Between the respective pairs of lips 76 the shafts 72 are transversely drilled and threaded to receive wing screws 79 which extend outboard therefrom, their inner ends being swivelly retained in brackets 80 just inboard of the brackets 77. Just inboard of the brackets 77 are mounted a pair of fore and aft skids 82, upturned at their ends, on the lower ends of posts 83 whose upper ends are received in bosses 84 on the lower faces of the platforms 70 and vertically adjustable therein by means of thumbscrews 85. The outer ends of the extensions 12 are also provided with handles 86 secured to the top faces of the platforms 70 by which the extensions 12 can be conveniently raised. If desired, an appropriate counterbalancing mechanism can be incorporated in the hinge arms 68 to remove much of the weight on the skids 82.

Each cutting mechanism, as already noted, consists essentially of a moving toothed band with clasps and a fixed cutting assembly. Since those for the mower 10 and the side extensions 12 are virtually identical, they are hereafter jointly described and identical reference numerals are employed. The fixed cutting assemblies 90 (see FIGS. 3 and 7 – 9) extend horizontally between and beneath the respective pairs of band pulleys 58a and 74a, 58b and 74b, 60a and 60b, being mounted to their respective platforms 14 and 70 by means of angle brackets 91 depending therefrom. Each cutting assembly 90 includes a flat, lower plate 92 having upturned and downturned rear portions 93a, 93b and upturned ends secured to the angle brackets 91 just outboard of the drive surfaces of their respective pairs of band pulleys 58a and 74a, 58b and 74b, 60a and 60b. Over the plate 92 is laid a fixed cutter bar 94, then a strip of non-frictional bearing material 95, such as nylon, next a strip of similar non-frictional material 97 which forms a band guide channel 98 with a rabbet along the forward upper face of the bearing material 95, and finally an upper plate 99 which together with the bearing material 97 overhangs the forward edge of the plate 92. The strip of bearing material 97 is permanently adhered to the plate 99 by means of a suitable adhesive, and, as will be noted from FIG. 9, the strip of material 95 terminates well to the rear of the forward edge of the lower plate 92. Furthermore, as will be observed from FIGS. 3 and 7, the cutter bars 94 and strips of bearing material 95 terminate on the periphery of, while the upper plates 99 and the strips of bearing material 97 terminate just inboard of, the frictional surfaces of the respective pairs of band pulleys 58a and 74a, 58b and 74b, 60a and 60b, the band guide channels 98 being in tangential relation thereto.

Each cutting assembly 90 is releasably held together by means of a row of double-headed pins 102 fixed in the upper plate 99 and extending down through the assembly 90, the lower head 102a of each pin 102 engaging a pair of inclined ramps 103 upset from the sides of one of a series of elongated slots 104 along a locking bar 105 on the under face of the lower plate 92 and slidable therealong. The lower ends of the ramps 103 terminate in enlarged apertures 106 through which the heads 102a can pass, which apertures are carried up through the lower plate 92, the cutter bar 94 and the bearing material 95. The locking bar 105, which is formed from suitable spring material, is provided with several guide blocks 107 secured to the lower plate 92 through which the locking bar 105 slides and one end of the latter is turned to provide a tang 108 by which the bar 105 can be operated. Accordingly, when the locking bar 105 is slid in the direction indicated by the arrows in FIG. 7, the heads 102a of the pins 102 arrive at the enlarged apertures 106, whence the upper plate 99 and the pins 102 can be lifted away and the cutter bar 94 removed. Sliding the locking bar 105 in the opposite direction causes the entire assembly 90 to be tightly sandwiched together owing to the spring ramps 103.

The endless moving bands 110 are formed of lengths of suitable spring steel, appropriately butt welded, and pass around the friction surfaces of the respective pairs of band pulleys 58a and 74a, 58b and 74b, 60a and 60b and through the guide channels 98 of each cutting assembly 90. The bands 110 are all driven in the same direction, as indicated by the arrows in FIGS. 2, 6, 10, 12 and 13, by the drive pulleys 48a, 48b. This is accomplished owing to the fact the drive V-pulley 50a, belt 52a and V-pulley 48a propel the shaft 37a to which the V-pulley 48a is fixed together with the band pulleys 58a and 60a, while the V-pulley 50b, belt 52b and V-pulley 48b drive the shaft 37b to which the V-pulley 48b and band pulley 58b are fixed, it being remembered that the band pulleys 60b, 74a and 74b are journaled on rather than being fixed to their respective shafts 37b and 72. Note that since the drive shafts 37a, 37b are outboard of the wheels 18 and 22, the latter do not depress the grass ahead of any of the cutting assemblies 90.

Each band 110 is provided with a number of rather widely spaced, integral teeth 111 along its forward edge of generally trapezoidal shape which project from the cutting assemblies 90 forward of the upper plates 99 as shown in FIGS. 9 and 10. Each tooth 111 is formed with a rectilinear flat leading or cutting edge portion 112 and an upset or arched trailing portion 113 for reasons to be explained. The forward edge of each fixed cutter bar 94, which is also a length of suitable spring steel, is provided with a series of closely spaced, triangular-shaped teeth 115, also formed integrally therewith, whose rectilinear cutting edges 116 are generally perpendicular to the direction of travel of the band 110 and whose remaining portions 117 are downwardly turned, as shown in FIGS. 9 and 11, for reasons also to be explained. As can be likewise observed in FIGS. 9 and 11 the fixed teeth 115 are upwardly inclined and project slightly beyond the moving teeth 111, being resiliently engaged by the latter during their passage thereover. The clasps 120 are integrally formed of spring steel wire and have cranked ends 121 and shanks 122 which are anchored in spring clips 123 welded to the tops of the moving teeth 111. The ends 121 of the clasps 120 are slidable axially into sleeves 124 integrally formed in the clips 123 and lying along the base of the teeth 111 while the shanks 122 snap laterally under overhanging leaves 125, also integral with the clips 123, along the junctures between the cutting edges 112 and the upset portions 113 of the teeth 111. An upwardly bowed, grass retaining arm 126 of each clasp 120 extends angularly from its shank 122 in a direction toward both that of tooth travel and that of mower travel to an outer bend 127 whence it reverses itself to form a grass deflecting arm 128 below the fixed teeth 115 and somewhat to the rear of the collecting arm 126, the arms 128 being extended to trail the cutting edges 112, all for reasons to be described. By grasping a clasp 120 by its retaining arm 126 or pressing on end 121, and forcing it parallel to its end 121, its shank 122 can be forced out from beneath the leaf 125 and then the clasp rotated upwardly and withdrawn from the sleeve 124 for replacement.

The guide channels 98 of the cutting assemblies 90 and the crowned frictional surfaces of the band pulleys 58a and 74a, 58b and 74b, 60a and 60b, serve to locate the bands 110 in proper position relative to the fixed teeth 115 during the cutting operation, while the strips of bearing material 97 in the cutting assemblies 90 engage the forward portion of the bands 110 and press the moving teeth 111 into resilient engagement with the fixed teeth 115. The arched trailing portions 113 of the moving teeth 111 and the downturned portions 117 of the fixed teeth 115, while also providing necessary stiffness, insure that the cutting edges 112 and 116 remain engaged in scissors-like action throughout the passage of the teeth 111 over the teeth 115. In the same vein, the distance "A" (see FIG. 10) between adjacent fixed teeth 115 is greater than the width "B" (see FIG. 12) of the cutting edges 112 of the moving teeth 111 so that the flat surface of width "B" thereof will have completely cleared the flat surface of a fixed tooth 115 before engaging the cutting edge 116 of the successive tooth 115, the cutting edge 112 thereby dropping down between the two teeth 115 and out of engagement with the previous one before it engages the successive cutting edge 116. This insures that neither of two successive fixed teeth 115 will interfere with the scissors action of a fixed tooth 111 during passage of the latter. Basically, the clasps 120 serve to gather the grass into separate bunches and propel it into the cutting assemblies 90. The upper retaining arms 126 tend to hold the grass up between the teeth 111 and 115 until cut, while the lower deflecting arms 128, since they are rearward of and below the retaining arms 126, tend to contact the grass beforehand at a lower point, straighten up the bent or slanting blades, fling the grass toward the teeth 111 and 115 and scatter the clippings afterwards. The portions of the deflecting arms 128 trailing the cutting edges 112 avoid losing contact with the bent or slanted blades, and the bowed arms 126 avoid entanglement of the clasps 120 with the teeth 115, especially at the upstream ends of the cutting assemblies 90. It is also desirable that there be no vertical clearance between the inner end of the arms 126 and the upper surfaces of the cutting edges 112 so that grass will not become wedged therebetween rather than fed to the teeth 111 and 115.

As mentioned previously two types of cleaning elements are used: fixed and rotating. The band pulleys 74a, 60a and 58b at the upstream ends of the cutting assemblies 90 are provided with spring blades 130, mounted by brackets 131 secured to the platforms 14 and 70, whose lower ends ride on and scrape the frictional surfaces of the pulleys 74a, 60a and 58b in order to clean them of grass and other debris tending to build up thereupon and thereby interfere with the drive of the bands 110. The upper ends of the blades 130 extend closely adjacent the under surfaces of the upper passes of the bands 110 aft of the teeth 111 in order to prevent the grass from entering between the upper passes of the bands 110 and the band pulleys 74a, 60a and 58b. For the same reasons the downstream ends of the cutting assemblies 90 are provided with similar blades 132 secured to and upstanding from the upper plates 99 whose upper ends ride on and scrape the frictional surfaces of the band pulleys 58a, 60b and 74b. The rotary cleaning elements which prevent build up of clippings are also located at the downstream ends of the cutting assemblies 90. The rotary cleaning elements comprise downwardly angled shafts 135 journaled in brackets 136 fixed to the adjacent undersides of the platforms 14 and 70. The upper ends of the shafts 135 are fitted with beveled friction bushings 137 which are driven by appropriate engagement with the rear faces of the respective band pulleys 58a, 60b and 74b (see FIGS. 3, 4, 5 and 6), while the lower ends of the shafts 135 are provided with wire whisks 138 which rotate between the respective cleaning blades 132 and cutting assemblies 90 to sweep the clippings rearwardly.

The cutting assemblies 90 are protected by a cover 140 for that of the mower 10 and a pair of covers 142 for those of the side extensions 12. The cover 140 is mounted to the forward end of the platform 14 atop a block 143 thereacross, while the two covers 142 are mounted to pairs of laterally spaced blocks 144 atop each platform 70. To accomplish this, the rear edges of the covers 140 and 142 are fitted with laterally spaced, rearward tangs 145 having notched ends 146, being also drilled forwardly thereof at 147. The notches 146 slip under headed pins 148, while the drilled appertures 147 fit over studs 149, all upstanding from the blocks 143 and 144. In the case of the cover 140 a pawl in the form of an appropriately shaped, resilient arm 150 pivoted at one end at 151 to the block 143 swings forwardly by means of the knob 152 to resiliently engage the top of the cover 140 and retain it in position (see FIG. 1). The covers 142, however, are retained by two pairs of nuts 153 screwed on the studs 149. The covers 140 and 142 extend well forward of the cutting assemblies 90 (including the clasps 120) and are provided with downturned lips 155, 156 and 157, 158 at their front edges and outer ends, respectively, whence the cutting assemblies 90 and especially the clasps 120 are effectively protected against damage from trees, posts, buildings and the like. If desired the end lips 156 and 158 of the covers 140 and 142 can be provided with forward deflectors (not shown) to insure that grass does not escape uncut between the lips 156 and 158 and the band pulleys 74a, 60a, 60b and 74b but is directed into the cutting assemblies 90.

As will be observed from FIGS. 5 and 6, when the side extensions 12 are lifted, the outboard offset of the hinge axes of the pintles 66 results in the bands 110 of the extensions 12 being slackened sufficiently, as indicated in FIG. 5, so as to cut off the drive from their respective band pulleys 58a, 58b when the extensions 12 are not in use. In order to prevent the bands 110 of the extensions 12 from slipping forward off their drive pulleys 58a, 58b and out of their cutting assemblies 90 when the extensions 12 are lifted or removed, the underside of each cover 142 is provided with a pair of laterally spaced stops 160 having downturned forward tangs 161 which engage and retain the forward edge of the upper passes of the bands 110 between the teeth 111, the upper passes being then upwardly bowed against the tops of the covers 142 owing to slackening of the tension thereon (see FIGS. 5 and 5A). When the extensions are lowered, the resulting retensioning of the bands 110 moves the upper passes thereof down out of engagement with the stops 160 (see FIG. 6).

Generally speaking, the tension of all three bands 110 should be just enough to insure that they are positively driven sufficiently to do their job. This will insure in turn that they will slip on their drive pulleys 58a, 60a and 58b in the event some foreign object should jam in the cutting assemblies 90.

Tensioning and alignment of the band 110 of the mower 10 is accomplished by turning the wing screw 39 to move the forward pillow block 38 by means of the nut 42 and thus the drive shaft 37b outboard until proper tension is achieved. The rear end of the shaft 37b is adjusted by the wing nut 47 slightly inboard, this being accommodated by the slotted plate 46, to provide a "splayed" relation of the two drive shafts 37a, 37b in order to keep the band 110 seated in its cutting assembly 90. Similarly, the tension of the two bands 110 of the side extensions 12 are adjusted by turning the wing screws 79 to move the forward ends of the shafts 72a, 72b outboard, proper "splaying" of the latter being achieved by adjusting the location of their rear ends by means of the nuts 78. The side extensions 12 can be removed when in their lowered position by springing the hinge arms 68 outwards to release the pintles 66 after the bands 110 have been slackened by turning the wing screws 79. Other details of the structure and operation of the lawnmower of the present invention will be apparent from the foregoing description and drawings, but specific dimensions of a successful, working embodiment of the moving and fixed teeth 111 and 115 and the clasps 120 will now be given and discussed together with certain design parameters which have emerged therefrom.

That embodiment employed 4-inch-diameter band pulleys inch, about 20-inch centers, giving a cutting width for each of the mower and the side extensions of over 20 inches or a total of more than 60 inches overall. The moving bands were fashioned from spring steel of 0.014 inch thickness and 1.0 inch overall width, their teeth being seven-sixteenths inch in length and spaced 2.0 inches apart center to center, while the fixed teeth were formed from 0.015 inch similar material with a tooth length also of seven-sixteenths inch. The width of the base of the fixed teeth was three-eighths inch, the distance "A" being a nominal three-sixteenths inch, while the angle "C" of their cutting edges was 90° and the angle "D" along the downturned portions 117 a nominal 120°, both with respect to the direction of band travel (see FIG. 10). The width of the base of the moving teeth was five-eighths inch, the angle "E" of their cutting edges was 120° with respect to the direction of band travel and the width "B" was one-eighth inch. Accordingly, the included angle "F" between the cutting edges of the fixed and moving teeth, that is, the difference between the angles "C" and "E," was about 30°. It was found that the angle "F" could vary from about 20° to 40°; increasing it from 30° to 40° increased the tendency of the cutting edges to push the grass forward before cutting it, while decreasing it from 30° disclosed a growing tendency to tear rather than to cut the grass as well as additional tooth wear. The angle "C" did not seem to be critical and apparently can be greater than 90° though probably it should not be too much less than 90° in order to avoid "shrouding" of the cutting edges of the fixed teeth and possible reduction in cutting efficiency. In any event, it appeared that the included angle "F" should remain within the above limits. Preferably, the relative spacing of the fixed and moving teeth are such that the cutting action of the teeth does not occur all at the same time but is evenly spaced or staggered for the reasons set forth in the above-mentioned U.S. Pat. No. 2,079,945.

The clasps, in turn, were formed from 0.05-inch-diameter spring wire, the length of the upper retaining arms being about seven-eighths inch while the angle "G" between the retaining arms and the direction of band travel was about 16°. Significantly, smaller angles, below about 7° to 10°, tended to push the grass across the fixed teeth rather than to bring it into the cutting teeth while larger angles increased the tendency to bend the grass before cutting it, though angles up to about 22° were found workable. The deflecting arms were about 1.0 inch long, the angle "H" between the deflecting arms and the direction of band travel being about 23° but angles up to about 30° proved feasible, while the minimum effective difference between angles "G" and "H" appeared to be about 3°. All the above were obtained with band speeds of about 625 feet per minute. However, a band speed of about 800-900 feet per second should be used in order to accommodate the more rapid operators, and in this case the angles "G" and "H" could perhaps both be somewhat less for best results. Generally speaking, within limits, the angles "G" and "H" can vary with band speed, the lower the speed the greater the two angles can be, and conversely. Furthermore, the fixed and moving teeth should be as long as practical inasmuch as the longer they are the lower the band speed can be simply because the longer teeth can cut more grass. Likewise, the longer the teeth the longer the arms of the clasps can be in order to gather the additional grass the longer teeth can handle.

The clasps need not be made of round material; they can be fashioned from flat stock instead, and can have various shapes so long as their essential functions are retained; for instance, the upper and/or lower arms could be somewhat curved in the horizontal plane. Likewise, they can be of heavier material depending upon the conditions to be encountered, and while preferably resilient, that is chiefly to reduce possible injury from stones and other hard objects. Nor of course need they be removable. FIG. 13 illustrates a clasp 220 formed integrally with a FIG. 211 of a moving band 210, the cutting edge 212 and the arched trailing portion 213 being extended outwardly for this purpose. The flat upper retaining arm 226 is twisted at its outer end to form the bend 227 and then the lower deflecting arm 228. While they are preferable, the lower deflecting arms of the clasps are not absolutely necessary inasmuch as the upper retaining arms alone will perform much of the essential task of gathering the grass and propelling it into the teeth. What appears to be lost without the lower arms is the ability to gather some of the bent or slanting blades, the ability more positively to bring the grass into the teeth, and especially the ability better to throw the clippings rearwardly. Finally, the clasps need not be actually attached to the moving teeth themselves. Instead, they could, for instance, be carried on a separate band or other means traveling in conjunction with the moving teeth.

At any rate, from the foregoing those skilled in the art will be able to employ and adapt the invention as the circumstances may require. Other items could also be readily supplied with the mower; for instance, heavier "weed bands," otherwise substantially identical but without clasps, to be used in place of the others when cutting weeds or heavy grass stiff enough not to require the gathering action of the clasps. The mower could be readily made self-propelled, and could be supplied with a suitable clutch to disengage the drive to the bands without stopping the motor or engine. It could be sold without the side extensions, the latter being available as an option instead. In any event, though the present invention has been described in terms of a specific embodiment, being the best mode presently known of carrying out the invention, it is not thereby limited to that embodiment alone. Instead, the following claims are to be read as encompassing all adaptations and modifications of the invention falling within the spirit and scope thereof.

I claim:

1. In a lawnmower having a laterally extending grass cutting assembly disposed transversely with respect to a first direction constituting the operative direction of travel of the mower, said cutting assembly including a pair of sets of discrete cutting elements therealong extending forwardly therefrom in said first direction, one of said sets of cutting elements moving relative to the other along said assembly in a second direction of travel transversely with respect to said first direction, said elements of each of said sets having cooperating cutting portions disposed to receive therebetween and cut grass during travel of the mower in said first direction, the improvement comprising: grass gathering means traveling in said second direction along said assembly, said gathering means extending from said assembly forwardly of said cutting elements and in cooperative relation therewith effective to gather grass and propel the same between said cutting portions during travel of the mower in said first direction.

2. The lawnmower of claim 1 wherein said gathering means comprises a plurality of members having grass contacting portions inclined toward said second direction.

3. The lawnmower of claim 2 wherein said portions comprise upper and lower arms disposed respectively above and below said cutting elements, said lower arms having a portion disposed generally to contact the grass before said upper arms.

4. The lawnmower of claim 3 wherein the effective included angle between said lower arms and said second direction is greater than the effective included angle between said upper arms and said second direction, said lower arms having a portion in trailing relation to said cutting portions with respect to said second direction of travel.

5. The lawnmower of claim 4 wherein one of said gathering members is operatively associated with each of said moving cutting elements.

6. The lawnmower of claim 5 wherein one of said gathering members is removably attached to each of said moving cutting elements.

7. The lawnmower of claim 1 wherein one of said sets of cutting elements comprises a plurality of fixed cutting teeth and the other of said sets of cutting elements comprises a lesser number of moving cutting teeth overlying and in contact with said fixed teeth, said teeth having respective pairs of cutting edges effective to shearingly cut grass received therebetween, said cutting edges constituting said cooperating cutting portions; and wherein said gathering means comprises a plurality of discrete elements inclined toward said second direction and secured to and traveling with said moving teeth.

8. The lawnmower of claim 7 wherein each of said gathering elements comprises an upper grass retaining arm secured to its respective one of said moving teeth and disposed generally thereabove, and a lower grass deflecting arm carried by said upper arm and disposed generally below said fixed teeth, said lower arms being located effective generally to contact the grass before said upper arm during travel of the mower in said first direction.

9. The lawnmower of claim 8 wherein the effective included angle between said upper arm and said second direction is less than the effective included angle between said lower arm and said second direction, said lower arm having a portion in trailing relation to its respective pair of said cutting edges with respect to said direction of travel of said moving teeth, each of said moving teeth having one of said gathering elements secured thereto.

10. The lawnmower of claim 9 wherein said upper arm is removably fixed to its respective one of said moving teeth.

11. The lawnmower of claim 9 wherein said moving teeth are disposed along a forward edge of an endless band, said band being driven to provide movement of said teeth thereof in said second direction, each of said moving teeth having a leading edge with respect to said second direction constituting said cutting edge thereof and an upwardly formed trailing portion.

12. The lawnmower of claim 11 wherein said cutting edges are substantially rectilinear and have an effective included angle of about 20° to 40°.

13. The lawnmower of claim 12 wherein said included angle is about 30°.

14. The lawnmower of claim 11 wherein each of said gathering elements comprises an integral structure; and wherein the effective included angles between said upper and lower arms and said second direction are generally proportional to the linear speed of said moving teeth.

15. The lawnmower of claim 14 wherein said upper arm angle is about 7° to 22° and said lower arm angle is about 17° to 30°, the minimum difference between said angles being about 3°.

16. The lawnmower of claim 14 wherein the effective length of said upper arm is generally proportional to the effective forward reach of said fixed and moving teeth.

17. The lawnmower of claim 11 wherein each of said gathering elements is integrally formed with its respective one of said moving teeth.

18. A grass cutting component for a lawnmower, said component comprising an endless band having a forward edge extending longitudinally of said band and formed to provide a set of forwardly extending cutting teeth therealong, said teeth having leading cutting edges and grass gathering elements, said elements comprising grass retaining arms extending forwardly from said teeth and angled in a leading direction with respect to and beyond said edges, the forward ends of said collecting arms being formed to provide grass deflecting arms extending rearwardly from said collecting arms and angled in a trailing direction with respect to and beyond said leading edges, said retaining and deflecting arms straddling said teeth, the effective included angles between said retaining arms and the forward edge of said band being less than the effective included angle between said deflecting arms and the forward edge of said band.

19. The band of claim 18 wherein each of said gathering elements comprises an integral structure removably secured to said teeth.

20. The band of claim 18 wherein said gathering elements are integrally formed with said teeth.

21. A grass cutting component for use in a lawnmower, said component comprising an endless band having a forward edge formed to provide a set of forwardly extending cutting teeth therealong, each of said teeth having a leading cutting edge and an arched trailing portion, and means carried by each of said teeth for releasably attaching thereto a grass gathering element.

22. A grass gathering element for replaceable attachment to grass cutting teeth formed along an endless band adapted for driven grass cutting movement in a lawnmower, said element comprising an integral structure having an arched grass retaining arm with an end portion formed for attachment to said teeth, the other end of said arm being reversely formed to provide a grass deflecting arm in spaced, staggered relation to said retaining arm and extending beyond said end portion thereof.

* * * * *